(12) United States Patent
Scannell et al.

(10) Patent No.: US 11,143,329 B2
(45) Date of Patent: Oct. 12, 2021

(54) VALVE SYSTEM WITH POSITION INDICATOR

(71) Applicants: ENTEGRIS, INC., Billerica, MA (US); LUXEMBOUG PATENT COMPANY SA, Lintgen (LU)

(72) Inventors: Christopher Scannell, Middlebury, CT (US); Joseph R. Despres, Middletown, CT (US); Pascal Chir, Montigny-les-Metz (FR); Paul Muzzo, Yutz (FR)

(73) Assignee: Entegris, Inc., Billerica, MA (US)

( * ) Notice: Subject to any disclaimer, the term of this patent is extended or adjusted under 35 U.S.C. 154(b) by 110 days.

(21) Appl. No.: 16/564,496

(22) Filed: Sep. 9, 2019

(65) Prior Publication Data
US 2020/0088318 A1    Mar. 19, 2020

Related U.S. Application Data (60) Provisional application No. 62/730,696, filed on Sep. 13, 2018.

(51) Int. Cl.
*F16K 37/00* (2006.01)
*F17C 13/04* (2006.01)

(52) U.S. Cl.
CPC ........ *F16K 37/0075* (2013.01); *F17C 13/045* (2013.01)

(58) Field of Classification Search
CPC .......................... F16K 37/0075; F17C 13/045

USPC .................................................. 137/553, 556
See application file for complete search history.

(56) References Cited

U.S. PATENT DOCUMENTS

| | | | |
|---|---|---|---|
| 6,481,459 B2* | 11/2002 | Fukano et al. | F16K 37/0058 137/553 |
| 2005/0139268 A1* | 6/2005 | Kremer et al. | F16K 1/302 137/553 |
| 2017/0032967 A1* | 2/2017 | Sinha et al. | C23C 14/34 |
| 2018/0119888 A1 | 5/2018 | Elzer | |
| 2018/0306345 A1 | 10/2018 | Chir | |
| 2018/0356041 A1* | 12/2018 | Despres et al. | F17C 13/026 |

FOREIGN PATENT DOCUMENTS

| | | |
|---|---|---|
| JP | S62274182 A | 11/1987 |
| JP | H1082472 A | 3/1998 |
| WO | 2017060310 W | 4/2017 |
| WO | 2017079550 A2 | 5/2017 |

OTHER PUBLICATIONS

"Open-Close Indicator" Brochure; Rotarex S.A.; 2018.

* cited by examiner

*Primary Examiner* — Kevin L Lee (57) ABSTRACT

A valve system having a valve position indicator is disclosed. The valve position indicator allows for viewing of the valve position from one or more viewing locations. In one example, the valve position indicator includes a side valve open/close indicator and a top valve open/close indicator on a valve assembly. An indicator locking mechanism securely locks the valve position indicator in alignment with a position of a control valve.

20 Claims, 6 Drawing Sheets

VALVE SYSTEM WITH POSITION INDICATOR

BACKGROUND

Fluid dispensing systems often include a valve assembly coupled to a fluid storage cylinder. One example of such a system is a valve assembly coupled to a gas storage tank. It is often difficult to visibly determine whether the valve assembly is open, partially open, or closed. Lack of a suitable valve position indicator may cause a valve to be unknowingly left open resulting in a dangerous situation. The valve position indicator must also be robust enough to operate in a failsafe manner when used during many open/close operations.

Patent application published WO 2017/060310 A1 discloses an indicator of the opening and/or closing status of a device controlling the flow of a fluid, such as a tap or a pressure reducer for compressed gas, comprising a sleeve-shaped support to rotatably engage with a protruding portion of a body of the device and from which an actuating spindle extends along a longitudinal axis of said device; an indicator sleeve axially sliding along the support; a rotor to be fixed to the spindle and comprising at its periphery a least one track with a curved profile; and at least one track follower extending radially from the indicator sleeve through a longitudinal slot in the support and engaging with the at least one track.

Further, in several semiconductor facilities the fluid storage cylinders are located in different orientations. In this case, it may be difficult to check if the valve is fully closed or open. This can cause confusion and create a hindrance in operating conditions. In addition, in certain application like in the semiconductor activity, the valve of a gas cylinder, including the open/closed indicator needs to be particularly robust.

For these and other reasons, there is a need for the present invention.

SUMMARY

In one or more examples, the present embodiments provide a valve system or a gas storage and delivery system having a valve assembly with a unique valve position indicator. The valve position indicator allows for viewing of the valve position from one or more viewing locations. The valve position indicator includes a valve open/close indicator valve assembly. Furthermore, the open/close indicator located on the top of the valve assembly, or the bottom of the valve assembly, or both the top of the control valve and the side of the valve assembly; The valve position indicator is in threaded engagement with a body of the valve assembly and securely locked by a lock ring.

DETAILED DESCRIPTION

In the following Detailed Description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized, and structural or logical changes may be made without departing from the scope of the present invention. The following detailed description, therefore, is not to be taken in a limiting sense, and the scope of the present invention is defined by the appended claims.

In one or more examples, the present embodiments provide a valve system and a gas storage and delivery system used as a fluid dispensing and storing package. Fluid is typically stored in the cylinder under pressure. For example, one type of gas storage and delivery system is a gas cylinder. The valve assembly includes a flow control valve that is translatable between a full open and full closed position. The position of the flow control valve in the valve assembly is changeable by a valve actuator, such as a manual hand wheel or pneumatic actuator.

In general, the gas cylinder (i.e. storage vessels) includes sidewalls and an interior and can be of a type that is known for use in the storage, handling, and delivery of reagent gases or fluids, at any pressure. The sidewalls are designed to withstand a pressure that safely exceeds a desired maximum pressure recommended of a gas contained by the vessel.

Certain example storage vessels include adsorbent material at an interior of the vessel, and reagent gas at the interior. In connection with the valve system that is useful in a novel and inventive method of conveying information relating to the flow control valve in the valve assembly coupled to the storage and delivery system.

In another example of a storage and delivery system, the interior of the system contains gaseous reagent gas that is at a pressure that is below atmospheric pressure (a sub-atmospheric pressure) when the vessel is at an ambient temperature at a location for use of the reagent gas, e.g., at a desired operating temperature. The ambient temperature and operating temperature can be any temperature at which a vessel is used to handle, store, process, transport, or use a reagent gas, in any particular and relevant industry or application.

The gas cylinder can be closed, but usually includes an opening that selectively allows for reagent gas to be added to or removed from the vessel's interior, such as a discharge port that may include a valve that can be opened and closed. Attached to the valve at the discharge port may be a flow or pressure-regulating mechanism such as a pressure valve or a flow metering device. To achieve a desired pressure or flow rate of the flow of reagent gas from the vessel, a pressure regulator, flow meter, or other flow-regulating device may be at the valve head external to the vessel interior. Alternately or additionally, one or more pressure regulator, flow meter, or other flow-regulating device may optionally be connected to the vessel opening but internal to the vessel, at the vessel interior; an internal flow-regulating mechanism at an interior of the vessel is not required and may be excluded from a vessel of the present description.

According to certain example embodiments of described vessels and methods, a flow-regulating mechanism may be designed to operate at a pressure that is below one atmosphere, to allow reagent gas to be removed from the vessel interior at sub-atmospheric pressure. Examples of fluid supply vessels and appurtenant items such as flow valves and pressure valves of types that may be useful in a general sense according to the present description, are described, e.g., in U.S. Pat. No. 6,132,492 and in PCT Patent Publication WO 2017/008039, the entire contents of these documents being incorporated herein by reference.

Example gas cylinders can contain adsorbent, (a.k.a. a solid-phase physical sorbent medium) at the vessel interior. The adsorbent has a sorptive affinity for one or more reagent gases such as one or more hazardous reagent gases. As such, the adsorbent can be useful for selectively, e.g., reversibly, adsorbing and desorbing reagent gas onto the adsorbent to allow the reagent gas to be: first delivered into the vessel in a manner to cause the reagent gas to adsorb onto the adsorbent; then to allow the adsorbed reagent gas (in equilibrium with an amount of desorbed, gaseous, reagent gas also at the vessel interior) to be stored within the closed vessel interior at approximately atmospheric pressure, preferably at sub-atmospheric pressure; and eventually to allow the reagent gas to be desorbed (e.g., under vacuum) from the adsorbent and removed from the vessel through an opening in the vessel, as gaseous reagent gas, preferably still at approximately atmospheric pressure, e.g., at sub-atmospheric pressure. Examples of adsorbent-based fluid supply systems and containers include products commercially available from Entegris, Inc., Billerica, Mass., USA, e.g., under the trademarks SDS, PDS, and SAGE.

Non-limiting examples of adsorbent material that are known and that may be suitable for use in a vessel as described herein include: polymeric adsorbents such as microporous TEFLON, macroreticulate polymers, organic polymers, glassy domain polymers; aluminum phosphosilicate (ALPOS); clays; zeolites, metal-organic frameworks, porous silicon; honeycomb matrix materials; activated carbon; and other carbon materials, and other similar materials. Some examples of carbon adsorbent materials include: carbon formed by pyrolysis of synthetic hydrocarbon resins such as polyacrylonitrile, sulfonated polystyrene-divinylbenzene, etc.; cellulosic char; charcoal; activated carbon formed from natural source materials such as coconut shells, pitch, wood, petroleum, coal, etc.

The gas cylinders as described may be substantially filled with a bed of suitable adsorbent material. The adsorbent may be in any shape, form, size, etc., to efficiently and reversibly adsorb reagent gas onto the adsorbent for storage in the vessel at sub-atmospheric pressure. The size, shape, and physical properties such as porosity can affect the capacity of the adsorbent (to adsorb reagent gas) as well as the packing density and void (interstitial space) volume of the adsorbent, and these factors can be selected based on a balance of factors of a storage vessel system including the type of reagent gas, the type of adsorbent, operating temperature of the vessel, among others. The adsorbent material may have any suitable size, shape, porosity, range of sizes, and size distribution. Examples of useful shapes and forms include beads, granules, pellets, tablets, shells, saddles, powders, irregularly-shaped particulates, pressed monoliths, extrudates of any shape and size, cloth or web form materials, honeycomb matrix monolith, and composites (of the adsorbent with other components), as well as comminuted or crushed forms of the foregoing types of adsorbent materials.

These types of example vessels contain at the interior, the adsorbent, bearing a physically adsorbed reagent gas, in equilibrium with the reagent gas in gaseous form. The reagent gas (in any type of vessel, at any pressure) may be a hazardous reagent gas of a type that is known to be noxious, poisonous, or otherwise a safety risk. Toxic and other hazardous specialty gases are used in a number of industrial applications, such as for uses that include: ion implantation, epitaxial growth, plasma etching, reactive ion etching, metallization, physical vapor deposition, chemical vapor deposition, photolithography, cleaning, and doping, with these uses being part of the manufacture of semiconductor, microelectronic, photovoltaic, and flat-panel display devices and products. However, the use of a gas cylinder or method as described can be applied to reagent gases being used in other applications and in other industries, because the improved level of safety provided by the inventive methods and vessels applies to reagent gases and vessels generally, in any commercial or industrial context, and when used for any purpose or application. The described vessels and method are useful with any reagent gas, particularly those that are hazardous, noxious, or otherwise dangerous. Yet the utility of the presently described vessels and methods are not limited to particular reagent gases or gases contained at a low to moderate pressure (e.g., about 1 atmosphere). Illustrative examples of reagent gases for which the described vessels and methods are useful include the following non-limiting gases: silane, methyl silane, trimethyl silane, hydrogen, methane, nitrogen, carbon monoxide, diborane, $BF_3$, arsine, phosphine, phosgene, chlorine, $BCl_3$, $B_2D_6$, tungsten hexafluoride, hydrogen fluoride, hydrogen chloride, hydrogen iodide, hydrogen bromide, germane, ammonia, stibine, hydrogen sulfide, hydrogen cyanide, hydrogen selenide, hydrogen telluride, deuterated hydrides, trimethyl stibine, halides (chlorine, bromine, iodine, and fluorine), $NF_3$, $ClF_3$, $GeF_4$, $SiF_4$, $AsF_5$, organo compounds, organometallic compounds, hydrocarbons, and organometallic Group V compounds such as $(CH_3)_3Sb$. For each of these compounds, all isotopes are contemplated.

Alternatively, a gas cylinder may include an internally pressure-regulated type, an interior volume of the vessel, wherein a reagent gas is in the interior volume. Examples of the reagent gas include, but are not limited to, silane, diborane, arsine, phosphine, chlorine, boron trichloride, boron trifluoride, $B_2H_6$, tungsten hexafluoride, trimethyl stibine, hydrogen fluoride, hydrogen chloride, hydrogen iodide, hydrogen bromide, germane, ammonia, stibine, hydrogen sulfide, hydrogen selenide, hydrogen telluride, $GeF_4$, $SiF_4$, $NF_3$, silane, methyl silane, trimethyl silane, hydrogen, methane, nitrogen, carbon monoxide, bromine, iodine, and fluorine organometallic compounds, $AsF_5$, hydrocarbons, organometallic compounds, including all isotopes. In alternative embodiments of the invention the gas cylinder can contain two or more reagent gases wherein the two or more reagent gases comprises at least one dopant source gas, a diluent gas source, and optionally a supplemental gas source. The dopant source can include but not limited to enriched boron trifluoride (eBF$_3$), enriched germanium tetrafluoride (eGeF$_4$), carbon monoxide (CO), carbon dioxide ($CO_2$), germanium tetrafluoride, diborane ($B_2H_6$), and enriched diborane ($eB_3H_6$). The diluent gas can include but not limited to hydrogen, xenon, and other noble gases.

An example of pressure-regulated vessels is commercially available from Entegris, Inc. (Billerica, Mass., USA) under the trademark VAC.

The valve system, which is coupled to the gas cylinder includes a valve assembly and a unique valve position indicator. The valve position indicator allows for viewing of the valve position from one or more viewing locations. In one example, the valve position indicator includes a side valve open/close indicator and a top valve open/close indicator. An indicator locking mechanism securely aligns and locks the valve position indicator on the valve body.

Figure 1:
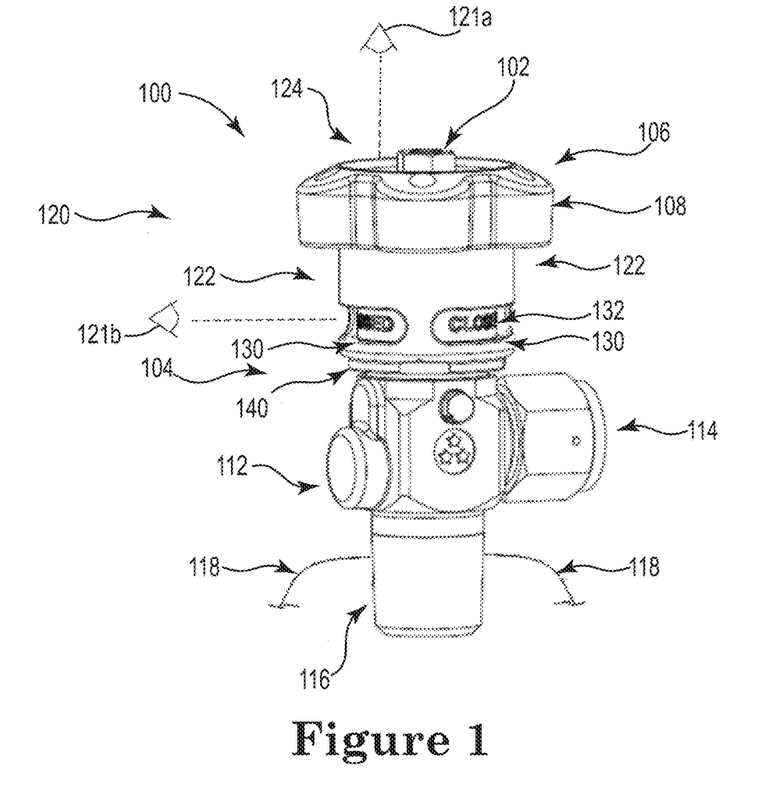
FIG. 1 illustrates one example of a valve system with a valve position indicator.

FIG. 1 illustrates one example of a valve system 100. The valve system 100 includes a valve assembly 102 located within a valve body 104. The valve assembly 102 includes a valve actuator 106 (in one example, a hand wheel 108 as shown) coupled to a control valve (located within the valve body). The valve body 104 includes a fluid discharge port, also known as a fill port or a gas extraction port 114. The valve body further includes a connection assembly 116 for coupling the valve system to a gas cylinder 118. The valve may optionally contain a pressure relief device where 112 is located.

Valve system 100 includes a valve position indicator 120 operably coupled to the valve assembly 102. Valve position indicator 120 allows for viewing of the control valve position from one or more orientations 121a, 121b on the valve assembly 102. In one example, the valve position indicator 120 includes a side (vertical) valve position indicator 122 and a top (horizontal) valve position indicator 124. The side valve position indicator 122 allows for viewing of the valve position from a side of the valve system 100. The valve position indicator 120 further includes side viewing ports 130. A valve OPEN or valve CLOSED indication is viewable from a side of the valve system through the viewing ports 130, indicated at 132.

Figure 2:
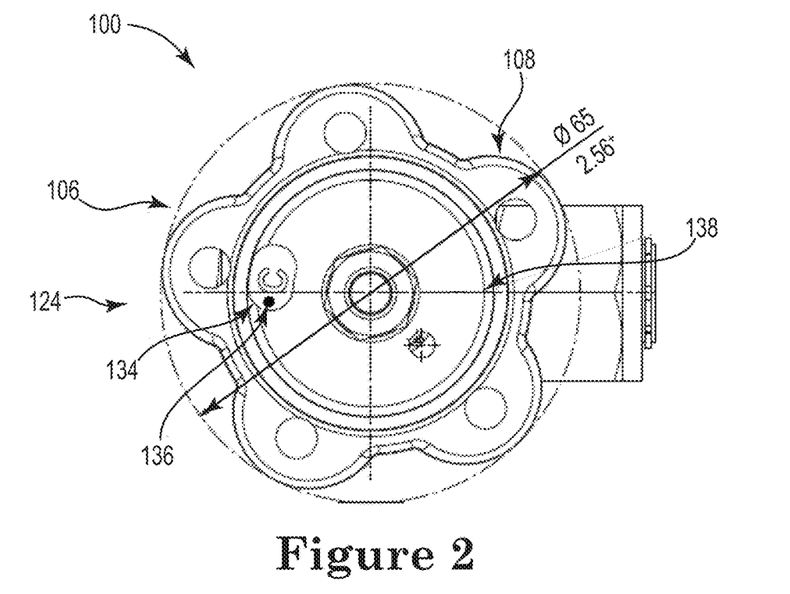
FIG. 2 is a top view of the valve system of FIG. 1.

In a similar manner, the top valve position indicator allows for viewing of the present control valve position (OPEN or CLOSED) from a location 121a on the top side of the valve system 100. FIG. 2 is a top view of the valve system 100, and illustrates one example of top position indicator 124. Valve system 100 includes actuator hand wheel 108. The hand wheel 108 includes a viewing port 134 for viewing the position of the valve, at 136. In one example, the valve position 136 is indicated by either a C for valve CLOSED or an O for valve OPEN. Alternatively or in addition to this valve position state abbreviation, colors are used to indicate the valve position, enabling language independent operation. In another example, the hand wheel 108 further includes a central portion 138 that is clear, allowing viewing of the top position indicator through the hand wheel central portion 138.

According to the invention, certain embodiments of the invention may only have a side open/close indicator or a top open/close indicator.

In reference again to FIG. 1, valve system 100 includes an indicator locking mechanism 140. The indicator locking mechanism 140 operates to align valve position indicator 120 with valve assembly 102, and in particular with the position of the control valve within the valve assembly 102. In one example, the indicator locking mechanism 140 securely retains the valve position indicator 120 in position relative to the valve assembly 102.

In FIG. 1, the indicator locking mechanism 140 is located immediately adjacent (below) the valve position indicator 120, and includes a lock-nut. The indicator locking mechanism is first threaded onto the valve body, in a location above the control valve. Next, the valve position indicator is threaded onto the valve body 104 and aligned with the position of the control valve within the valve assembly. The indicator locking mechanism 140 is then screwed tight against the valve position indicator to lock the valve position indicator in place relative to the valve assembly control valve. This allows for true, repeatable operation of the valve position indicator 120.

Figure 3:
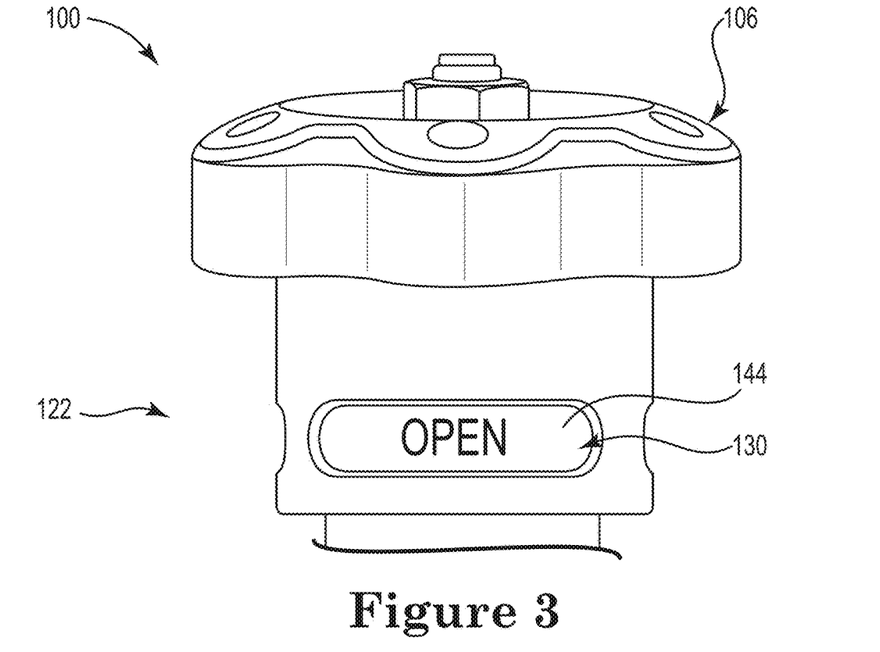
FIG. 3 is a side view illustrating one example of a valve system having a valve position indicator in a valve OPEN position.
Figure 4:
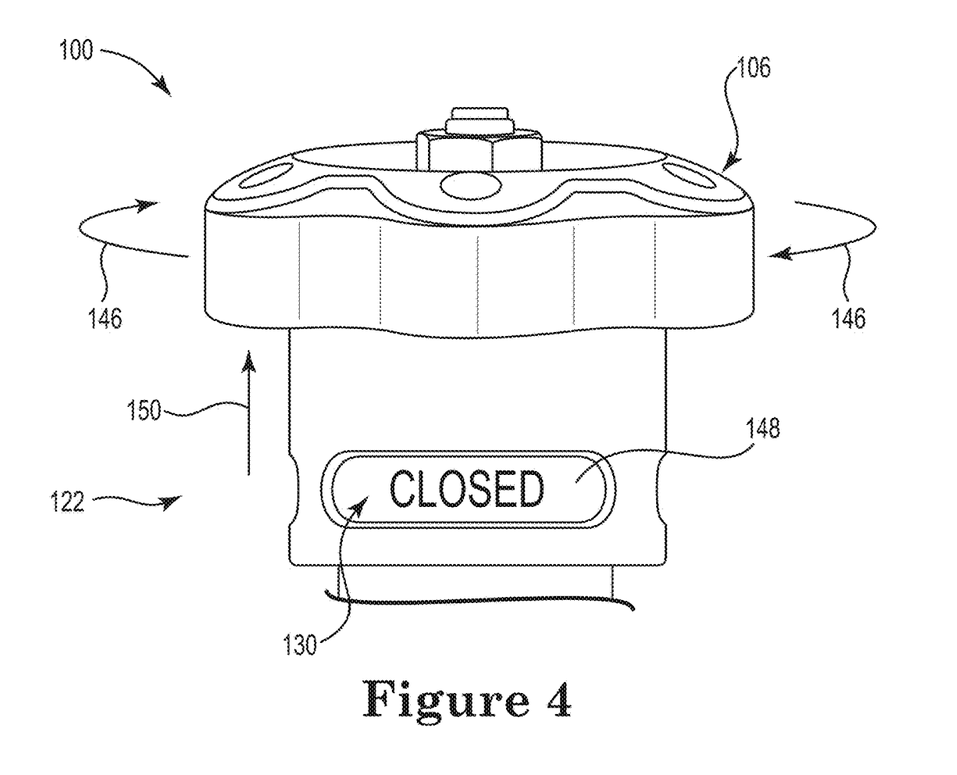
FIG. 4 is a side view illustrating one example of a valve system having a valve position indicator in a valve CLOSED position.

FIG. 3 and FIG. 4 further illustrate one example of valve position indicator 120 indicating the valve assembly control valve in a full OPEN or full CLOSED position from a side reference view. In FIG. 3, the side valve position indicator 122 indicates that the control valve is in a full OPEN position. In one example, this is indicated by the lettering OPEN on a green sidewall 144. In FIG. 4, valve actuator 106 is operated to move the control valve from a full OPEN position to a full CLOSED position. This is indicated at 146 by rotating hand wheel 108, until a full CLOSED position is reached. Within viewing window 130, in one example rotating hand wheel 108 operates to move green sidewall 144 relative to red sidewall 148. In one example illustrated, rotating hand wheel 108 operates to raise green sidewall 144 out of view when the control valve reaches a full CLOSED position, indicated by arrow 150. This results in side valve position indicator 122 indicating a control valve full CLOSED position status.

Figure 5:
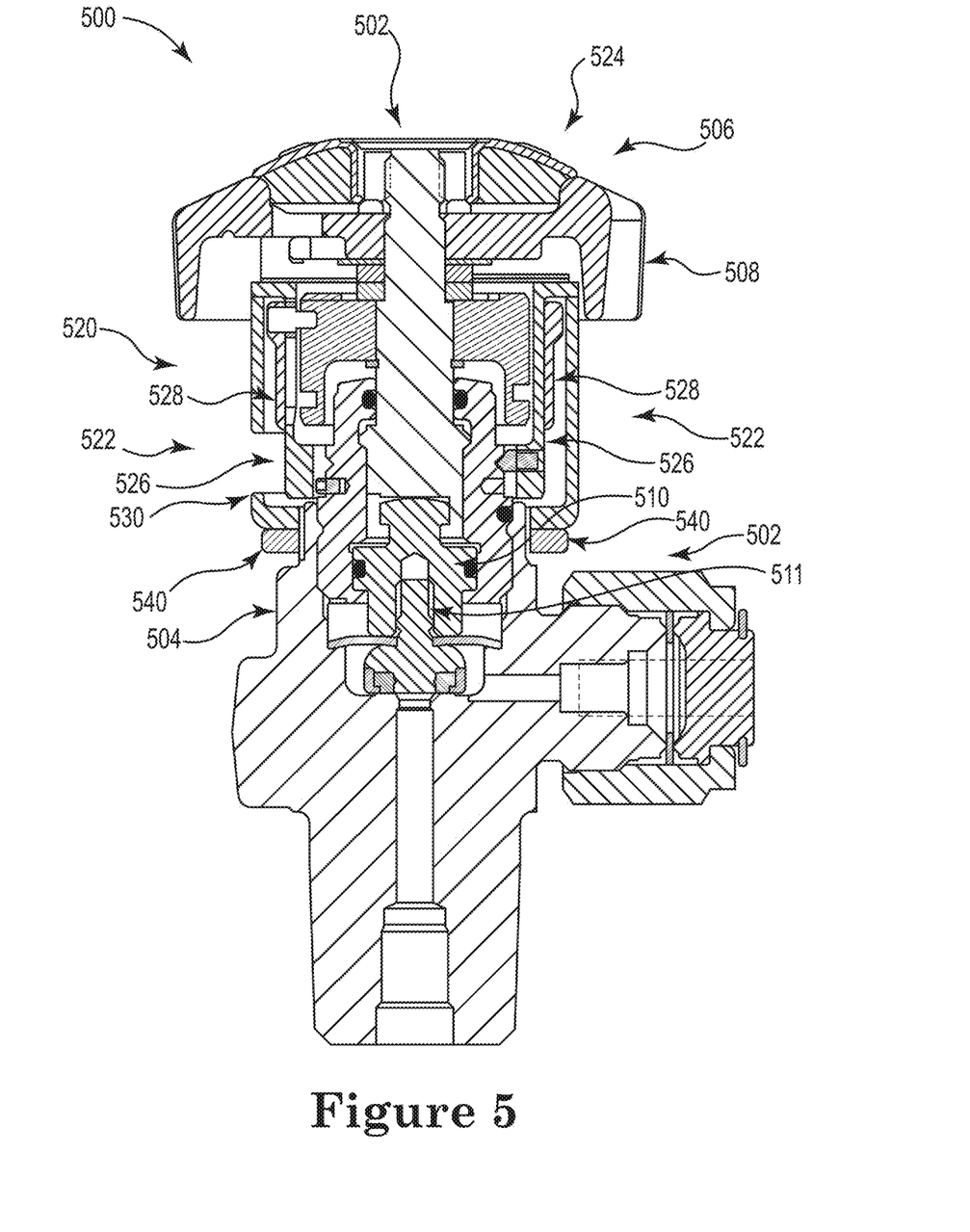
FIG. 5 is a diagram illustrating a cross-section of one example of the valve system of FIG. 1.
Figure 6:
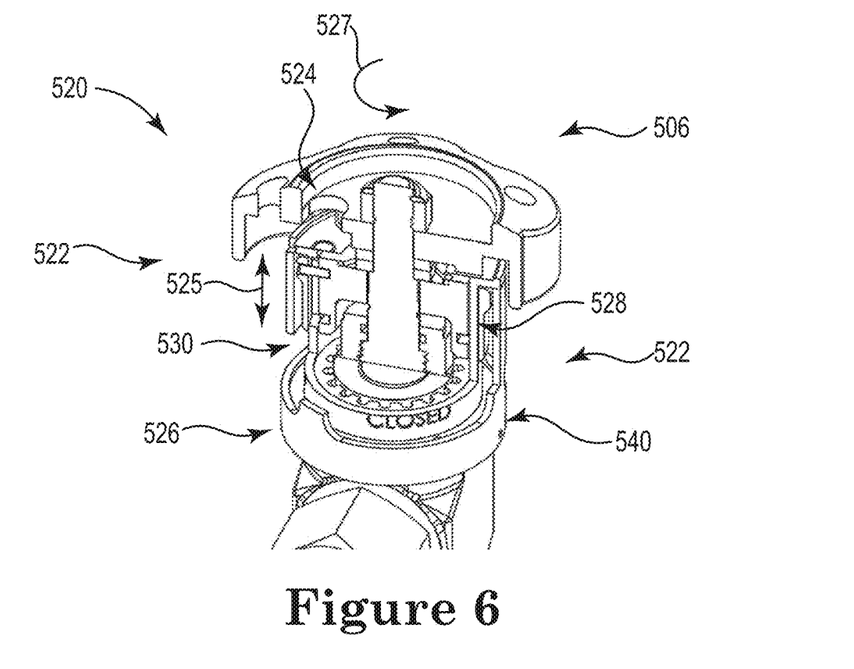
FIG. 6 illustrates one example of a valve position indicator.

FIG. 5 is a diagram illustrating a cross-section of one example of the valve system 500 which is similar to valve system 100 previously described herein. Valve system 500 includes valve assembly 502 operably positioned within the valve body 504. The valve assembly 502 includes a lower spindle 510 and a sealing surface/seat, generally illustrated at 511, that is operated to regulate the flow of fluid from a gas storage and delivery system through the valve assembly 502. In operation, the valve system 500 is operated via valve actuator 506 hand wheel 508, to move control valve 510 between an OPEN position and a CLOSED position.

Valve position indicator 520 is also illustrated in cross-sectional view, and includes side valve position indicator 522 and top valve position indicator 524. The side valve position indicator 522 includes a first (valve CLOSED) sleeve 526 and a second (valve OPEN) sleeve 528. In operation, the first sleeve 526 is moveable relative to the second sleeve 528 by operating valve actuator 506 to move the control valve 510 between a valve OPEN and a valve CLOSED position. The position of the control valve 510 is visually indicated through viewing port 530. Valve locking mechanism 540 locks valve position indicator in position and alignment with the position of control valve 510. Examples of valve locking mechanism 540 are explained in detail later in this specification.

Reference is also made to FIGS. 6-9. In one example, the valve CLOSED sleeve is red in color and in a fixed position within the side valve position indicator 522. The valve OPEN sleeve is green in color and moveable relative to the valve CLOSED sleeve indicated by arrow 525. The valve OPEN sleeve is coupled to valve actuator 506. By operating valve actuator 506 (indicated by arrow 527) to move the control valve 510 from a CLOSED position to a valve OPEN position, the valve OPEN sleeve is moved over the valve CLOSED sleeve and viewable in front of viewing port 530. See, for example, FIG. 6.

Figure 7:
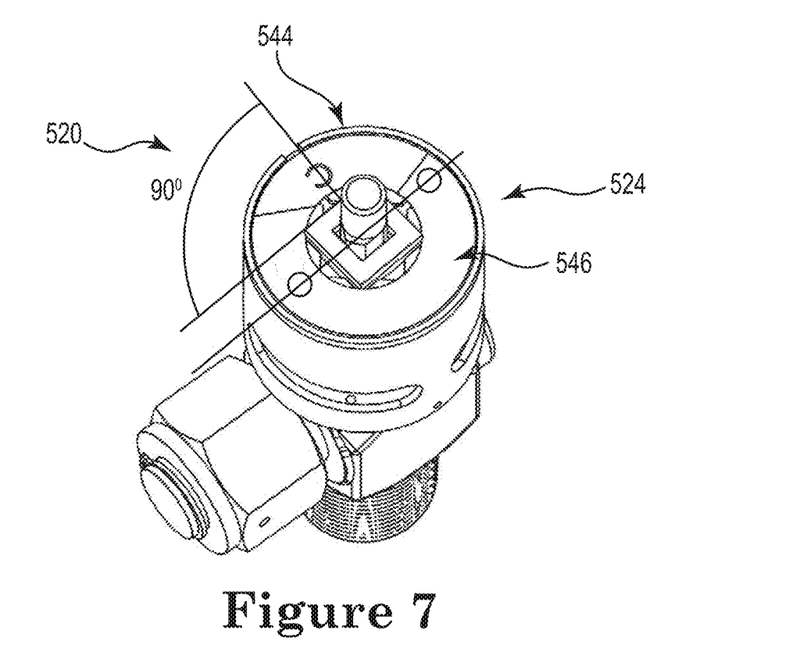
FIG. 7 is another cutaway view illustrating one example of a top valve position indicator.
Figure 8:
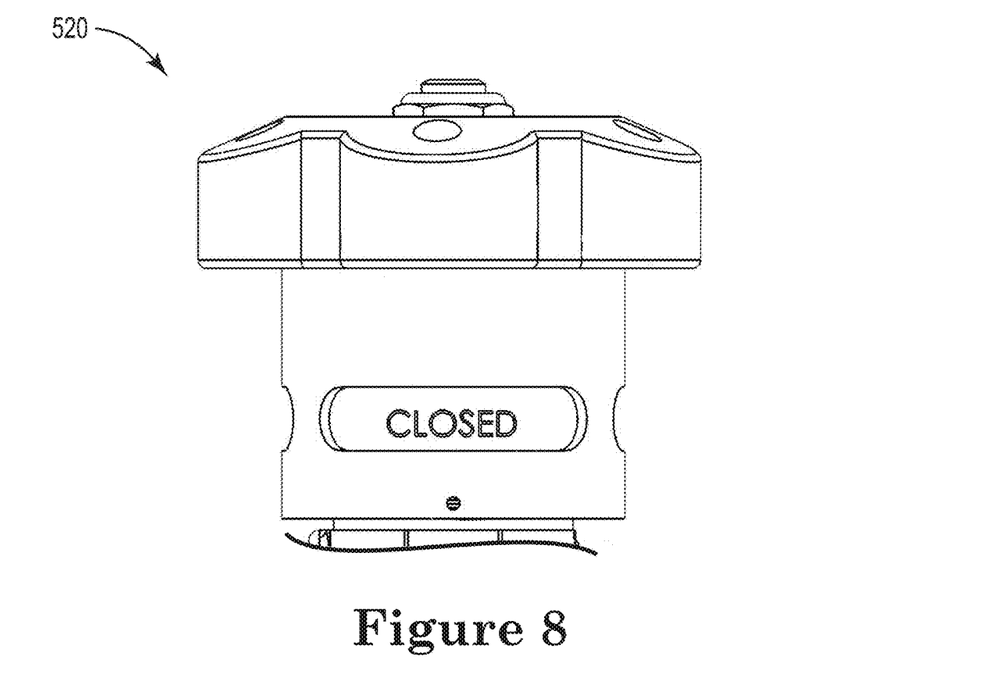
FIG. 8 and FIG. 9 are views of another embodiment of a valve position indicator in a closed position.
Figure 9:
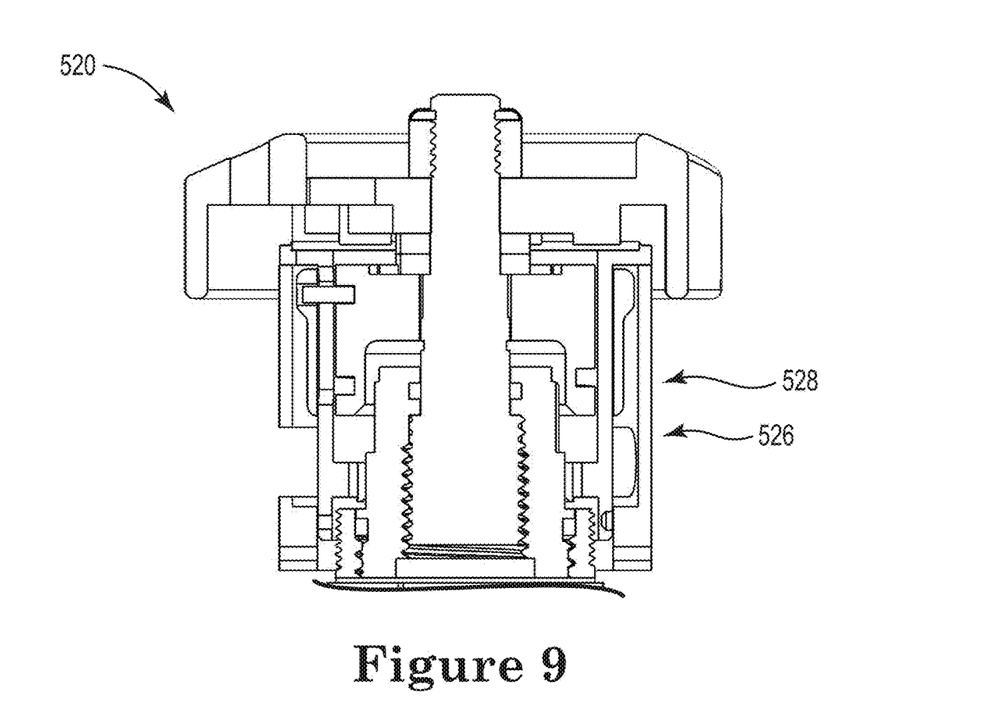

FIG. 7 illustrates one example of top valve position indicator 524. Hand wheel 508 is removed from valve actuator 524 and not shown. Top valve position indicator 524 is fixedly secured to the valve assembly 502. In the example illustrated, top valve position indicator 524 includes a first (valve CLOSED) red disc 544 positioned over a second (valve OPEN) green disc 546. The first disc 544 and second disc 546 are secured to the valve assembly 502 via screws. In operation, first disc 544 and second disc 546 are aligned with the top viewing port and control valve 510. Operation of valve actuator 506 to move control valve 510 from a CLOSED position to an OPEN position results on the first red disc being shown through the viewing port when the control valve is in a CLOSED position, and the second green disc being shown through the viewing port when the control valve 510 is in an OPEN position. FIG. 8 and FIG. 9 further illustrate the valve position indicator 520 when the control valve is in the valve CLOSED position. In other embodiments, the position indicator can be in the form of a sticker to indicate OPEN and CLOSED positions.

Figure 10:
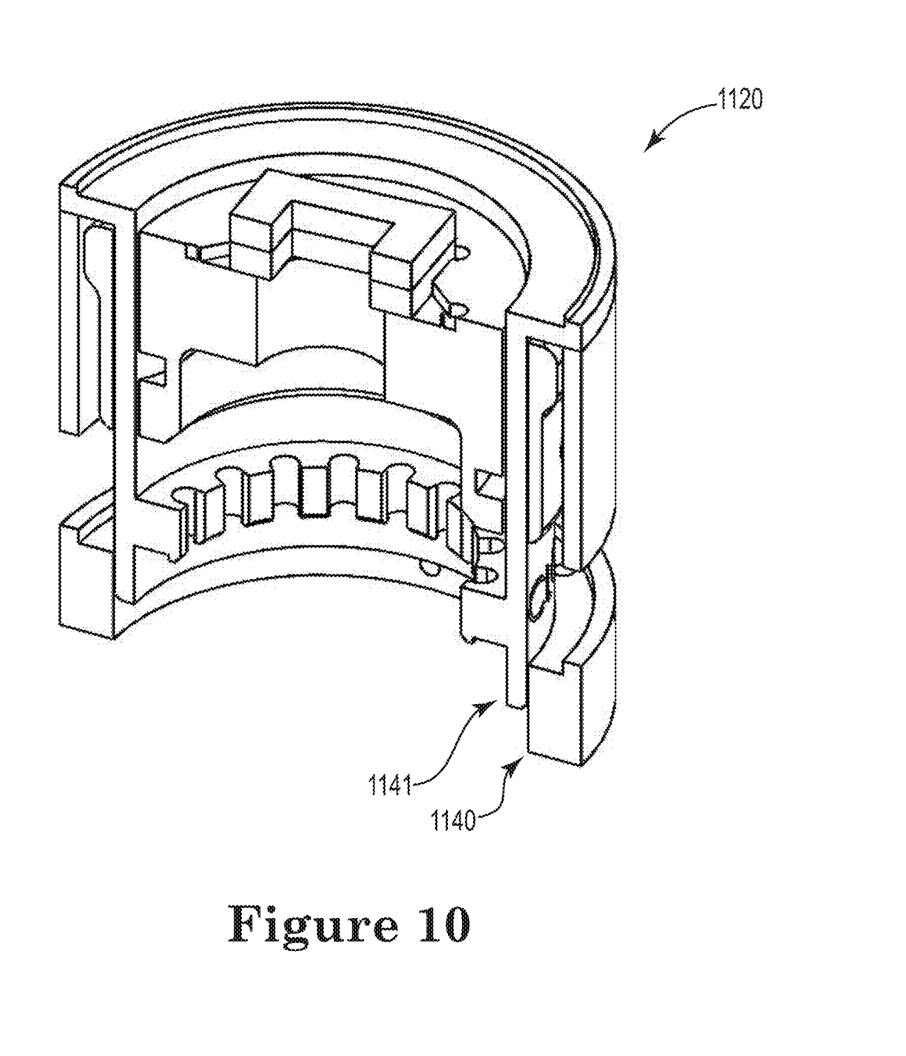
FIG. 10 is a cut-away view illustrating one example of a valve position indicator having an alignment locking mechanism.

FIG. 10 illustrates one example of a valve position indicator, indicated as valve position indicator 1120, in partial cut-away view. Valve locking mechanism 1140 is built into the position indicator 1120, and can be similar to the valve locking mechanism 140 previously described herein. In this example, the valve locking mechanism 1140 is in the form of a lock-ring to aid in operably aligning and locking the valve position indicator in place relative to a control valve (e.g., control valve 510).

Valve position indicator 1120 includes a threaded housing that can be mounted onto the valve body 104 bonnet nut threads. In one example, the valve alignment mechanism 1140 is part of the valve position indicator housing, and is threaded to match the valve body nut threads. In a similar manner, the valve position indicator fixed red sleeve is also threaded to match the valve body nut threads, indicated at 1141. In operation, the valve locking mechanism is first threaded down onto the valve body bonnet nut threads. Next, the valve position indicator 1120, and in particular the red sleeve, is threaded onto the valve body nut threads and aligned with the position of the control valve 510. This allows for infinite rotational adjustment to align the sleeve with the control valve position. Once the sleeve is aligned in the proper position, the valve locking mechanism 1140 in the form of a lock-ring is threaded back into the red sleeve to lock it in place and lock it into alignment with the control valve 510.

In another example, the threaded housing is in the form of a fully threaded sleeve that matches the bonnet nut threads on valve body. Additionally, the valve locking mechanism is a slotted attachment that operates to align the actual control valve position with the valve position indicator and lock the indicator in place. In operation, the valve position indicator is threaded onto the bonnet nut threads of the valve body. The valve position indicator is rotated to a position where the valve position indicator is properly aligned with the position of the control valve. A slotted screw connection is then used to lock the valve position indicator in proper alignment. In one example, locking mechanisms in the form of screws are secured into the slotted attachment to lock the valve position indicator in place. This results in a very durable alignment between the valve position indicator and the valve body.

The valve system disclosed herein having one or more valve position indicators is suitable for use with a number of different valves and a number of fluid discharge and storage systems. United States Patent Application Publication Nos. 2017/0122496 A1 and 2017/0248275 A1 illustrating examples of one or more valves and fluid discharge and storage packages suitable for use with the present invention.

Furthermore, the storage and delivery system of the present description may usefully contain or consist of a standard gas cylinder or other pressurizable vessel, and a cylinder valve or other flow dispensing assembly (regulators, monitors, sensors, flow directing means, pressure controllers, mass flow controllers, piping, valving, instrumentation, automatic start and shut-off devices, etc.) coupled to the vessel, with the cylinder holding the adsorbent material and reagent gas, the reagent gas being in a state of equilibrium between adsorbed sorbent gas and gaseous sorbent gas.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A valve system comprising:
    a control valve;
    a valve assembly that operates to open and close the control valve;
    a lock-ring; and
    a valve position indicator including a valve open/close indicator,
        wherein the valve open/close indicator is located on a top of the valve assembly, or a bottom of the valve assembly, or both a top of the control valve and a side of the valve assembly; and
        wherein the valve position indicator is in threaded engagement with a body of the valve assembly and securely locked in alignment with a position of the control valve by the lock-ring, and
        wherein the lock-ring connects to the valve position indicator.

2. The valve system of claim 1, further comprising a gas cylinder coupled to the valve system.

3. The valve system of claim 2, wherein the gas cylinder comprises:
    an interior volume;
    a reagent gas within the interior volume; and
    an exterior pressure surface.

4. The valve system of claim 2, wherein the gas cylinder comprises:
    an interior volume;
    an adsorbent within the interior volume, the adsorbent having sorptive affinity for a reagent gas, to contain sorptive gas as adsorbed reagent gas on the adsorbent in equilibrium with gaseous sorptive gas at the interior volume;
    a gaseous fluid flow port; and
    an exterior surface.

5. The valve system of claim 4, wherein the adsorbent is selected from a material comprising one or more of carbon, activated carbon, zeolite, porous organic polymers, and metal organic framework.

6. The valve system of claim 4, wherein the adsorbent is capable of adsorbing gas selected from silane, diborane, arsine, phosphine, chlorine, boron trichloride, boron trifluoride, $B_2H_6$, tungsten hexafluoride, trimethyl stibine, hydrogen fluoride, hydrogen chloride, hydrogen iodide, hydrogen bromide, germane, ammonia, stibine, hydrogen sulfide, hydrogen selenide, hydrogen telluride, $GeF_4$, $SiF_4$, $NF_3$, silane, methyl silane, trimethyl silane, hydrogen, methane, nitrogen, carbon monoxide, bromine, iodine, and fluorine organometallic compounds, $AsF_5$, hydrocarbons, and organometallic compounds, including all isotopes.

7. The valve system of claim 2, wherein the gas cylinder is a pressure-regulated cylinder comprising:
   an interior volume;
   at least one reagent gas in the interior volume;
   one or more pressure regulators; and
   an exterior surface.

8. The valve system of claim 7, wherein the at least one reagent gas is a gas selected from silane, diborane, arsine, phosphine, chlorine, boron trichloride, boron trifluoride, $B_2H_6$, tungsten hexafluoride, trimethyl stibine, hydrogen fluoride, hydrogen chloride, hydrogen iodide, hydrogen bromide, germane, ammonia, stibine, hydrogen sulfide, hydrogen selenide, hydrogen telluride, $GeF_4$, $SiF_4$, $NF_3$, silane, methyl silane, trimethyl silane, hydrogen, methane, nitrogen, carbon monoxide, bromine, iodine, and fluorine organometallic compounds, $AsF_5$, hydrocarbons, and organometallic compounds, including all isotopes.

9. The valve system of claim 7, wherein the gas cylinder comprises two or more reagent gases.

10. The valve system of claim 9, wherein the two or more reagent gases comprises at least one dopant source gas, a diluent gas source, and optionally a supplemental gas source.

11. The valve system of claim 10, wherein the at least one dopant source gas is selected from $eBF_3$, $eGeF_4$, $CO$, $CO_2$, $GeF_4$, $B_2H_6$, and $eB_2H_6$.

12. The valve system of claim 10, wherein the diluent gas source is hydrogen.

13. A valve system comprising:
   a control valve;
   a valve assembly that operates to open and close the control valve;
   an indicator locking mechanism including a slotted attachment; and
   a valve position indicator including a valve open/close indicator,
      wherein the valve open/close indicator is located on a top of the valve assembly, or a bottom of the valve assembly, or both a top of the control valve and a side of the valve assembly; and
      wherein the valve position indicator is in threaded engagement with a body of the valve assembly and is locked in alignment with a position of the control valve by the slotted attachment of the indicator locking mechanism.

14. The valve system of claim 13, further comprising a gas cylinder coupled to the valve system,
   wherein the gas cylinder comprises:
      an interior volume;
      a reagent gas within the interior volume; and
      an exterior pressure surface.

15. The valve system of claim 13, further comprising a gas cylinder coupled to the valve system,
   wherein the gas cylinder comprises:
      an interior volume;
      an adsorbent within the interior volume, the adsorbent having sorptive affinity for a reagent gas, to contain sorptive gas as adsorbed reagent gas on the adsorbent in equilibrium with gaseous sorptive gas at the interior volume;
      a gaseous fluid flow port; and
      an exterior surface;
         wherein the adsorbent is selected from a material comprising one or more of carbon, activated carbon, zeolite, porous organic polymers, and metal organic framework; and
         wherein the adsorbent is capable of adsorbing gas selected from silane, diborane, arsine, phosphine, chlorine, boron trichloride, boron trifluoride, $B_2H_6$, tungsten hexafluoride, trimethyl stibine, hydrogen fluoride, hydrogen chloride, hydrogen iodide, hydrogen bromide, germane, ammonia, stibine, hydrogen sulfide, hydrogen selenide, hydrogen telluride, $GeF_4$, $SiF_4$, $NF_3$, silane, methyl silane, trimethyl silane, hydrogen, methane, nitrogen, carbon monoxide, bromine, iodine, and fluorine organometallic compounds, $AsF_5$, hydrocarbons, and organometallic compounds, including all isotopes.

16. The valve system of claim 13, further comprising a gas cylinder coupled to the valve system,
   wherein the gas cylinder is a pressure-regulated cylinder comprising:
      an interior volume;
      at least one reagent gas in the interior volume;
      one or more pressure regulators; and
      an exterior surface;
         wherein the at least one reagent gas comprises a gas selected from silane, diborane, arsine, phosphine, chlorine, boron trichloride, boron trifluoride, $B_2H_6$, tungsten hexafluoride, trimethyl stibine, hydrogen, hydrogen fluoride, hydrogen chloride, hydrogen iodide, hydrogen bromide, germane, ammonia, stibine, hydrogen sulfide, hydrogen selenide, hydrogen telluride, $GeF_4$, $SiF_4$, $NF_3$, silane, methyl silane, trimethyl silane, hydrogen, methane, nitrogen, carbon dioxide, carbon monoxide, bromine, iodine, and fluorine organometallic compounds, $AsF_5$, hydrocarbons, and organometallic compounds, including all isotopes.

17. A valve system comprising:
   a control valve;
   a valve assembly that operates to open and close the control valve;
   a lock-ring; and
   a valve position indicator including a valve open/close indicator,
      wherein the valve open/close indicator is located on a top of the valve assembly, or a bottom of the valve assembly, or both a top of the control valve and a side of the valve assembly, and
      wherein the valve position indicator is in threaded engagement with a body of the valve assembly and securely locked in alignment with a position of the control valve by the lock-ring, and
      wherein the valve open/close indicator includes:
         a first sleeve; and
         a second sleeve moveable relative to the first sleeve for changing the valve open/close indicator from indicating a closed valve to indicating an open valve.

18. The valve system of claim 17, further comprising a gas cylinder coupled to the valve system,
   wherein the gas cylinder comprises:
      an interior volume;
      a reagent gas within the interior volume; and
      an exterior pressure surface.

19. The valve system of claim 17, further comprising a gas cylinder coupled to the valve system,
wherein the gas cylinder comprises:
an interior volume;
an adsorbent within the interior volume, the adsorbent having sorptive affinity for a reagent gas, to contain sorptive gas as adsorbed reagent gas on the adsorbent in equilibrium with gaseous sorptive gas at the interior volume;
a gaseous fluid flow port; and
an exterior surface;
wherein the adsorbent is selected from a material comprising one or more of carbon, activated carbon, zeolite, porous organic polymers, and metal organic framework; and
wherein the adsorbent is capable of adsorbing gas selected from silane, diborane, arsine, phosphine, chlorine, boron trichloride, boron trifluoride, $B_2H_6$, tungsten hexafluoride, trimethyl stibine, hydrogen fluoride, hydrogen chloride, hydrogen iodide, hydrogen bromide, germane, ammonia, stibine, hydrogen sulfide, hydrogen selenide, hydrogen telluride, $GeF_4$, $SiF_4$, $NF_3$, silane, methyl silane, trimethyl silane, hydrogen, methane, nitrogen, carbon monoxide, bromine, iodine, and fluorine organometallic compounds, $AsF_5$, hydrocarbons, and organometallic compounds, including all isotopes.

20. The valve system of claim 17, further comprising a gas cylinder coupled to the valve system,
wherein the gas cylinder is a pressure-regulated cylinder comprising:
an interior volume;
at least one reagent gas in the interior volume;
one or more pressure regulators; and
an exterior surface;
wherein the at least one reagent gas comprises a gas selected from silane, diborane, arsine, phosphine, chlorine, boron trichloride, boron trifluoride, $B_2H_6$, tungsten hexafluoride, trimethyl stibine, hydrogen, hydrogen fluoride, hydrogen chloride, hydrogen iodide, hydrogen bromide, germane, ammonia, stibine, hydrogen sulfide, hydrogen selenide, hydrogen telluride, $GeF_4$, $SiF_4$, $NF_3$, silane, methyl silane, trimethyl silane, hydrogen, methane, nitrogen, carbon dioxide, carbon monoxide, bromine, iodine, and fluorine organometallic compounds, $AsF_5$, hydrocarbons, and organometallic compounds, including all isotopes.

* * * * *